(12) United States Patent
Cheston et al.

(10) Patent No.: US 6,996,705 B2
(45) Date of Patent: Feb. 7, 2006

(54) METHOD AND SYSTEM FOR CONFIGURING THE LANGUAGE OF THE BIOS IN A COMPUTER SYSTEM

(75) Inventors: Richard Wayne Cheston, Morrisville, NC (US); Daryl Carvis Cromer, Apex, NC (US); Howard J. Locker, Cary, NC (US); David B. Rhoades, Raleigh, NC (US); Randall S. Springfield, Chapel Hill, NC (US); James P. Ward, Raleigh, NC (US)

(73) Assignee: Lenovo (Singapore) Pte. Ltd. (SG)

( * ) Notice: Subject to any disclaimer, the term of this patent is extended or adjusted under 35 U.S.C. 154(b) by 489 days.

(21) Appl. No.: 09/990,084

(22) Filed: Nov. 21, 2001

(65) Prior Publication Data

US 2003/0097555 A1 May 22, 2003

(51) Int. Cl.
*G06F 13/14* (2006.01)

(52) U.S. Cl. .............................. 713/1; 713/2; 713/100; 710/260; 710/261

(58) Field of Classification Search .................... 713/1, 713/2, 100; 710/260, 261
See application file for complete search history.

(56) References Cited

U.S. PATENT DOCUMENTS

| | | | | |
|---|---|---|---|---|
| 4,459,581 A | * | 7/1984 | Wilson et al. ................. 341/23 |
| 5,144,567 A | | 9/1992 | Oelsch et al. ................ 364/708 |
| 5,297,027 A | * | 3/1994 | Morimoto et al. ........ 715/501.1 |
| 5,659,308 A | | 8/1997 | Goff ............................. 341/26 |
| 5,717,428 A | | 2/1998 | Barrus et al. ................ 345/168 |
| 5,802,318 A | | 9/1998 | Murray et al. ............... 395/280 |
| 5,914,676 A | * | 6/1999 | Akpa ........................... 341/23 |
| 6,014,616 A | * | 1/2000 | Kim ............................... 704/8 |
| 6,061,794 A | | 5/2000 | Angelo et al. .............. 713/200 |
| 6,070,204 A | | 5/2000 | Poisner ....................... 710/100 |
| 6,178,503 B1 | * | 1/2001 | Madden et al. ................ 713/2 |
| 6,219,721 B1 | * | 4/2001 | Su ................................ 710/2 |
| 6,272,456 B1 | * | 8/2001 | de Campos ................... 704/8 |
| 6,289,303 B1 | | 9/2001 | Atkin et al. .................... 704/8 |
| 6,467,038 B1 | * | 10/2002 | Piwonka et al. ............... 713/1 |
| 6,491,457 B2 | * | 12/2002 | Ahmed ....................... 400/477 |
| 6,512,467 B1 | * | 1/2003 | Hanko et al. ................. 341/22 |
| 6,604,101 B1 | * | 8/2003 | Chan et al. ..................... 707/4 |
| 6,615,287 B1 | * | 9/2003 | Behrens et al. ............... 710/8 |
| 6,754,668 B2 | * | 6/2004 | Noble et al. ................. 707/102 |

FOREIGN PATENT DOCUMENTS

JP 11327725 * 11/1999

* cited by examiner

*Primary Examiner*—A. Elamin
(74) *Attorney, Agent, or Firm*—Carlos Munoz-Bustamante Sawyer Law Group, LLP

(57) ABSTRACT

The present invention comprises a method and system for configuring the language of a BIOS of a computer system. The method and system comprise providing a plurality of BIOS images in the computer system, each of the plurality of BIOS images being related to a particular language, selecting one of the pluralities of BIOS images based on the language supported by the computer system and utilizing the selected BIOS to configure the computer system. Through the use of the method and system in accordance with the present invention, the language being supported by the computer system is determined when the computer system is booted up as opposed to when the computer system is being built. This results in an increase in manufacturing productivity since original equipment manufacturers can build computer systems without having to worry about language restrictions.

19 Claims, 3 Drawing Sheets

Common BIOS Image Files

Master Control program which can read USB Keyboard descriptor fields
Determine correct language
Than load right module below (Chinese, Japanese, etc.)

| Chinese | Japanese | English |
|---------|----------|---------|
| 211 | 212 | 213 |

FIGURE 2

METHOD AND SYSTEM FOR CONFIGURING THE LANGUAGE OF THE BIOS IN A COMPUTER SYSTEM

CROSS-RELATED APPLICATIONS

The present application is related to application Ser. No. 09/990,003, entitled "Method and System for Configuring an Operating System in a Computer System," assigned to the assignee of the present application and filed on the same date.

FIELD OF THE INVENTION

The present invention relates to computer systems and specifically to a method and system for automatically configuring the language of the Basic Input Output System (BIOS) in a computer system.

BACKGROUND OF THE INVENTION

BIOS is an essential set of routines in a personal computer stored on a chip that provides an interface between the operating system and the system hardware. The BIOS supports all peripheral technologies and internal services such as the realtime clock (time and date).

On startup, the BIOS tests the system and prepares the computer for operation by querying its own small memory bank for drive and other configuration settings. It searches for other BIOS's on the plug-in boards and sets up pointers (interrupt vectors) in memory to access those routines. The BIOS routines initialize all of the hardware technology within the computer so it is properly operating. It then loads the operating system and passes control to it.

Today, personal computers are used in many different countries throughout the world encompassing many different languages. Consequently, each different language requires a change to the BIOS and setup to support that specific language. Conventionally, computer systems are hard wired for a particular language when each system is built. In other words, the BIOS is selected based on a particular language at build time. This creates a problem if the user subsequently needs to use the system in a country with a language different than that in which the computer system was hard wired or because more than one language is spoken in the country, because the system must then be re-built with the correct BIOS implementation. This can be a tedious and cumbersome process if a computer is utilized in several different languages.

Therefore, what is needed is a method and system that automatically configures the BIOS based on the language requirement. The method and system should be simple, cost effective and capable of being easily adapted into existing technology. The present invention addresses such a need.

SUMMARY OF THE INVENTION

The present invention comprises a method and system for configuring the language of a BIOS of a computer system. The method and system comprise providing a plurality of BIOS images in the computer system, each of the plurality of BIOS images being related to a particular language, selecting one of the plurality of BIOS images based on the language supported by the computer system and utilizing the selected BIOS to configure the computer system.

Through the use of the method and system in accordance with the present invention, the language being supported by the computer system is determined when the computer system is booted up as opposed to when the computer system is being built. This results in an increase in manufacturing productivity since original equipment manufacturers can build computer systems without having to worry about language restrictions. The language is chosen at time of use by the end user vs. being predefined at manufacturing time. This is critical in regions where multiple different languages are spoken and there is no way of knowing which language the end user prefers at time of system build.

BRIEF DESCRIPTION OF THE DRAWINGS

FIG. 2 shows a common image file.

DETAILED DESCRIPTION

The present invention relates to a method and system for configuring the language of the BIOS in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein. The present invention is presented in the context of a preferred embodiment. The preferred embodiment of the present invention is a method and system for configuring the BIOS of a computer system based on a particular language. Through the use of the present invention, the language being supported by the computer system is determined by querying the keyboard when the system is booted.

Figure 1:
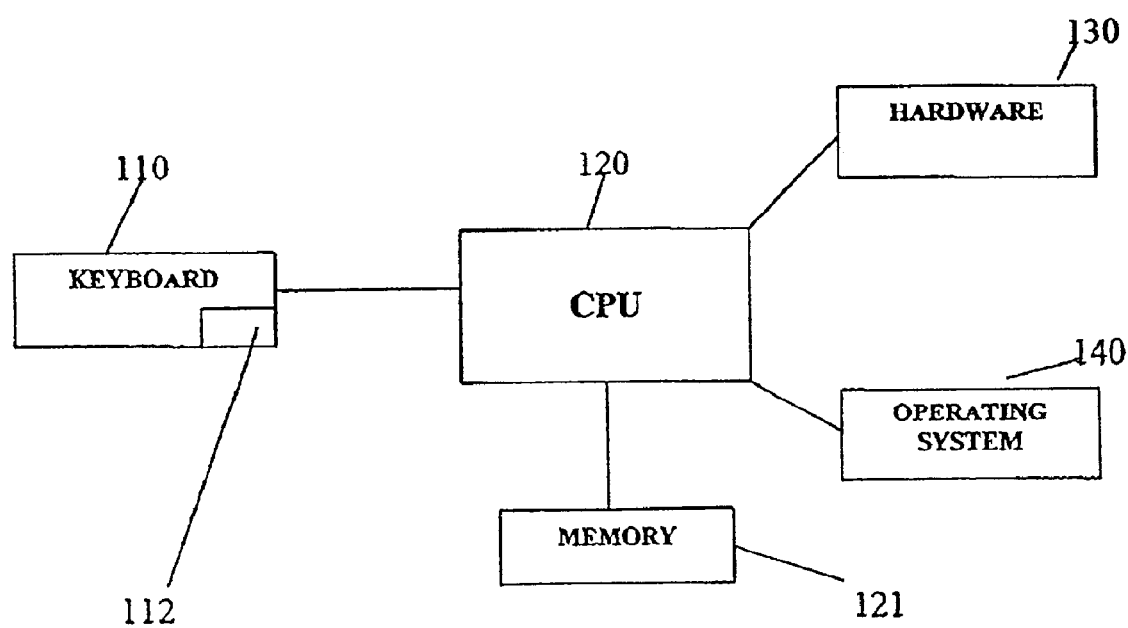
FIG. 1 is a system in accordance with the present invention.

For a further understanding of the present invention, please refer now to FIG. 1. FIG. 1 is a system 100 in accordance with the present invention. The system 100 comprises a keyboard 110, preferably a universal serial bus (USB) keyboard, a central processing unit 120, computer hardware 130, and an operating system 140. The USB keyboard 110 includes a port 123 which is coupled to the central processing unit 120. The central processing unit 120 is coupled to the computer hardware 130 and the operating system 140.

The central processing unit 120 refers to the processor and the I/O architecture (channels or buses). A memory 121 is coupled to the central processing unit 120. The operating system 140 is the master control program that runs the computer. The operating system 140 sets the standards for all application programs that run in the computer. BIOS is the essential set of routines in a personal computer that provides an interface between the operating system 140 and the system hardware 130.

The USB keyboard 110 includes a plurality of device descriptor files 112. The device descriptor files 112 contain information related to the keyboard, e.g. what type of device it is, who made the device, etc. The device descriptor files 112 also contain user defined fields called report descriptors. Report descriptors are strings of information that the operating system 140 can read. Report descriptors are a method of passing useful information about the USB device to the operating system or device driver. They are unique for each type of USB device. Report descriptors adhere to the following format: Item Type, Item Length, Item Value.

The system and method in accordance with the present invention takes advantage of this feature of a USB keyboard to allow for configuring the BIOS in a computer system. In accordance with the present invention, a new report descriptor (hereinafter "the language report descriptor") contains a new Item Type (first field in the report descriptor) defined as the keyboard language. The new Item Type would be a value currently unused within the USB Keyboard device class. This value would be picked from the unused values and would than be defined as the language report descriptor. The next field (Item Length) is how many bytes are reserved for the language value. The last field (Item Value) is the language of the USB keyboard. The language report descriptor identifies the particular language that the USB keyboard 110 supports.

In addition, in a system and method in accordance with the present invention, multiple languages are supported within the computer system via a common image file containing a plurality of BIOS images stored in the memory bank 121. Each of the plurality BIOS images supports a different language. FIG. 2, for example, is the common image file 210 wherein the common image file 210 contains a plurality of BIOS images 211, 212, 213 each of which supports a particular language. Although Japanese, English and Chinese are the languages shown in FIG. 2, one of ordinary skill in the art will readily recognize that a plurality of languages could be implemented while remaining within the spirit and scope of the present invention.

Based on this new item type, the language that the computer system will support can be determined by having the CPU 120 read the Language Report Descriptor stored in the USB keyboard (FIG. 1) upon the initialization of the computer system. Once the language is determined, the BIOS for the system is selected by the CPU 120 based on the language supported by the keyboard and utilized to configure the computer system. Accordingly, if a system user needs to change the language being supported by the computer system, the system user would simply swap the current keyboard with a keyboard that supports the desired language and then reboot the computer system.

Although the above described embodiment of the present invention is described in the context of utilizing the keyboard to determine the language being supported, one of ordinary skill in the art will readily recognize that a variety of devices could be utilized to determine the language being supported by the computer system while remaining within the spirit and scope of the present invention. In addition, although a USB keyboard is described in the preferred embodiment, any type of keyboard could be used that includes similar features and that use would be within the spirit and scope of the present invention.

Figure 3:
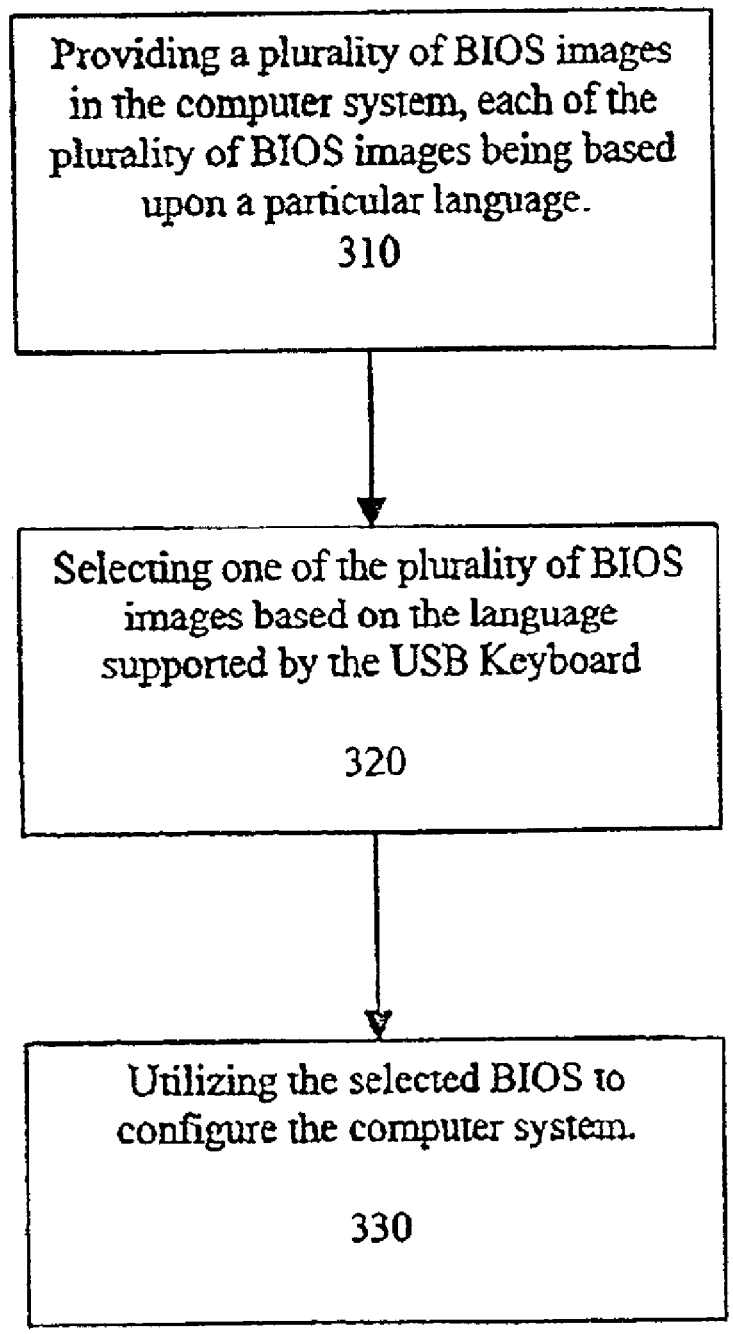
FIG. 3 is a flowchart of the method in accordance with the present invention.

For a better understanding of the present invention, please refer to FIG. 3. FIG. 3 is a flowchart of the method in accordance with the present invention. Such a method may be implemented, for example, by operating a computer system to execute a sequence of machine-readable instructions. The instructions usually reside in system ROM (read only memory) which in contained on the system logic board. The computer is designed so when it is first turned on the processor always reads the first instruction in the system ROM by always reading from a predetermined address which is the first byte in the system ROM. In this respect, another aspect of the present invention concerns a programmed product, comprising computer readable media tangibly embodying a program of machine readable instructions executable by a digital data processor to perform a method for configuring the BIOS of a computer system based on a particular language.

Alternatively, the instructions may be contained in another computer readable media such as a magnetic data storage diskette and directly or indirectly accessed by the computer system. Whether contained in the computer system ROM or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Referring back to FIG. 3, first, a BIOS select language control program with a plurality of BIOS images are provided in the computer system, each BIOS image being related to a language, via step 310. The BIOS select language control program queries the keyboard to determine the language supported by the keyboard, by querying the report descriptors within the device descriptor files. Next, a BIOS image is selected based on the language supported by the computer system, via step 320. The BIOS image is selected from the plurality of BIOS images located within the memory ROM of the computer system. Finally, the selected BIOS image is utilized to configure the computer system, via step 330. Accordingly, a system user can change the language being supported by the computer system by simply swapping the current keyboard with a keyboard that supports the desired language and then rebooting the computer system. A method and system for configuring the BIOS of a computer system based on a particular language is disclosed. Through the use of the method and system in accordance with the present invention, the language being supported by the computer system is determined when the computer system is booted up as opposed to when the computer system is being built. This results in an increase in manufacturing productivity since original equipment manufacturers can build computer systems without having to worry about language restrictions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for configuring a computer system, the method comprising the steps of:
   a) providing a plurality of BIOS images in a memory of the computer system, each of the plurality of BIOS images being related to a particular language;
   b) selecting one of the plurality of BIOS images from the memory based on the language supported by the computer system by querying a keyboard of the computer system; and
   c) utilizing the selected one BIOS image to configure the computer system.

2. The method of claim 1 wherein the plurality of BIOS images are provided via a BIOS select language control program.

3. The method of claim 1 wherein the keyboard comprises a universal serial bus (USB) keyboard.

4. The method of claim 3 wherein the keyboard comprises at least one report descriptor which identifies the language supported by the computer system.

5. The method of claim 4 wherein step b1) further comprises:

b1i) querying the at least one report descriptor to determine the language supported by the keyboard.

6. A system for configuring the language of a computer, the system comprising:

means for providing a plurality of BIOS images in a memory of the computer system, each of the plurality of BIOS images being related to a particular language;

means for selecting one of the plurality of BIOS images based on the language supported by the computer system by querying a keyboard of the computer system; and means for utilizing the selected one BIOS image to configure the computer system.

7. The system of claim 6 wherein the plurality of BIOS images are provided via a BIOS select language control program.

8. The system of claim 7 wherein the keyboard comprises a universal serial bus (USB) keyboard.

9. The system of claim 6 wherein the keyboard includes at least one report descriptor which identifies the language supported by the computer.

10. The system of claim 9 wherein the at least one report descriptor is queried to determine the language supported by the keyboard.

11. A computer readable medium containing program instructions for configuring the language of a computer system, the program instructions comprising the steps of:

a) providing a plurality of BIOS images in a memory of the computer system, each of the plurality of BIOS images being related to a particular language;

b) selecting one of the plurality of BIOS images from the memory based on the language supported by the computer system by querying a keyboard of the computer system; and c) utilizing the one selected BIOS image to configure the computer system.

12. The computer readable medium of claim 11 wherein the plurality of BIOS images are provided via a BIOS select language control program.

13. The computer readable medium of claim 11 wherein the keyboard comprises a universal serial bus (USB) keyboard.

14. The computer readable medium of claim 13 wherein the keyboard includes at least one report descriptor wherein the at least one report descriptor identifies a language supported by the computer system.

15. The computer readable medium of claim 14 wherein step (b1) further comprises:

(b1i) querying the at least one report descriptor to determine the language supported by the keyboard.

16. The keyboard of claim 15 wherein the at least one report descriptor is capable of being queried upon initialization of a computer system, to determine a language being supported by the keyboard.

17. A keyboard comprising:

a port for receiving a query; and a plurality of device descriptor files stored within the keyboard; the plurality of device descriptor files including a report descriptor that identifies the language supported by the computer system based on the query, wherein one of a plurality of BIOS images is selected based on the language supported by the computer system by querying the keyboard, and wherein the selected one BIOS image is utilized to configure the computer system.

18. The keyboard of claim 17 wherein the at least one report descriptor is capable of being queried upon initialization of a computer system, to determine a language being supported by the keyboard.

19. The keyboard of claim 18 wherein the port comprises a universal serial bus (USB) port.

* * * * *